April 28, 1942. O. A. WINDSOR 2,281,218
ELECTRIC DRILL
Filed July 9, 1940 2 Sheets-Sheet 1
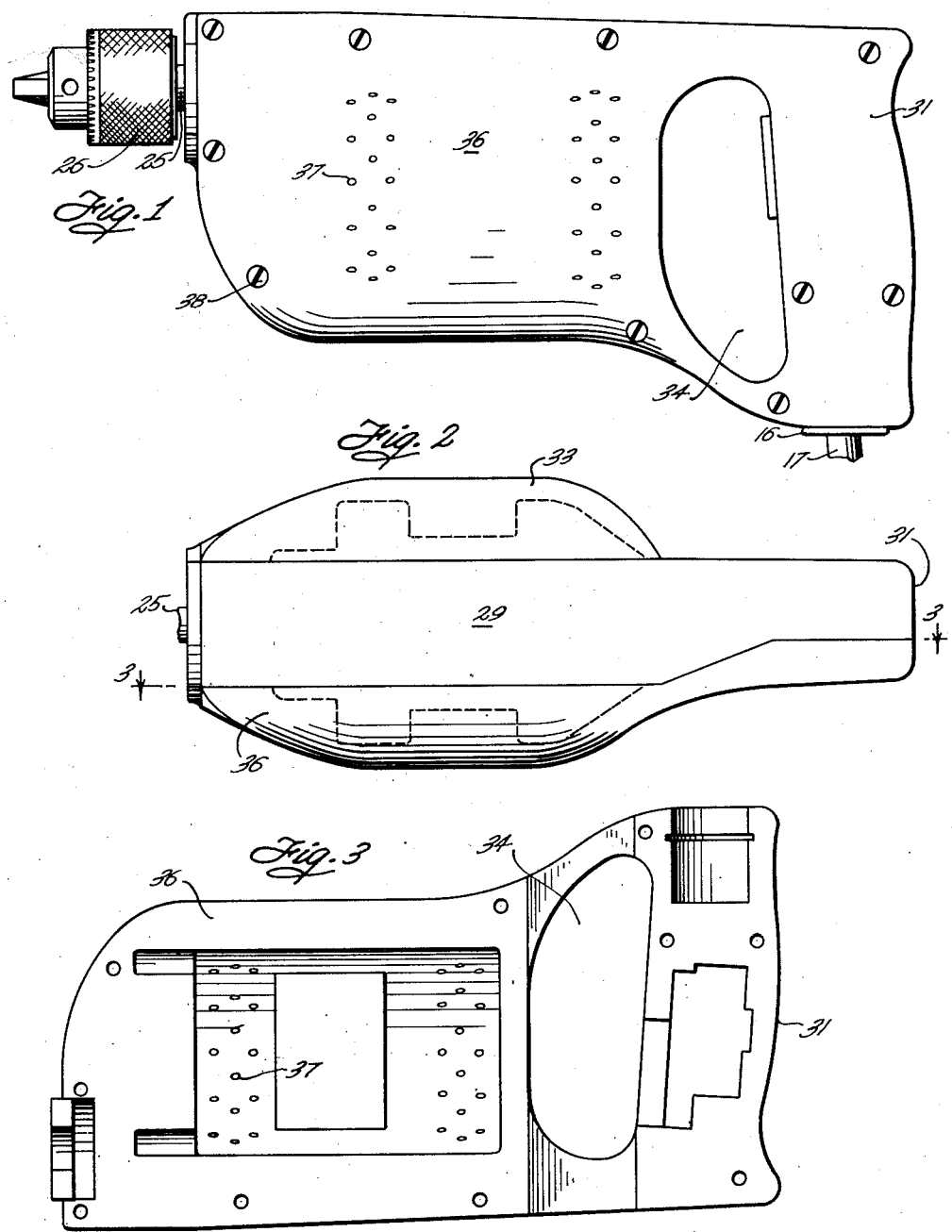

April 28, 1942.   O. A. WINDSOR   2,281,218
ELECTRIC DRILL
Filed July 9, 1940   2 Sheets-Sheet 2
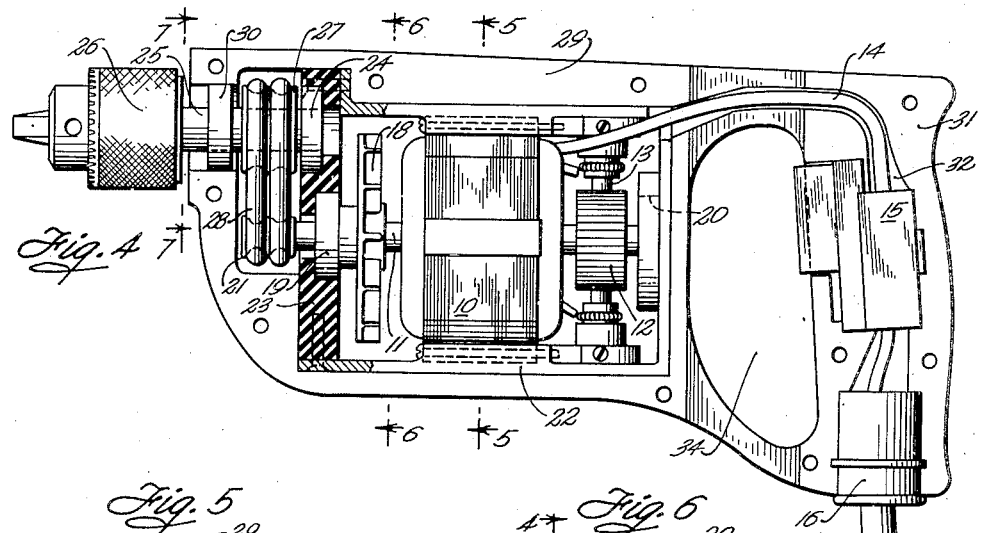
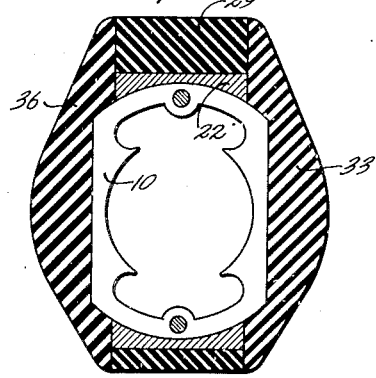
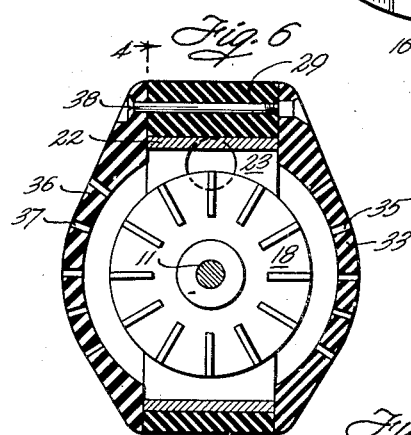
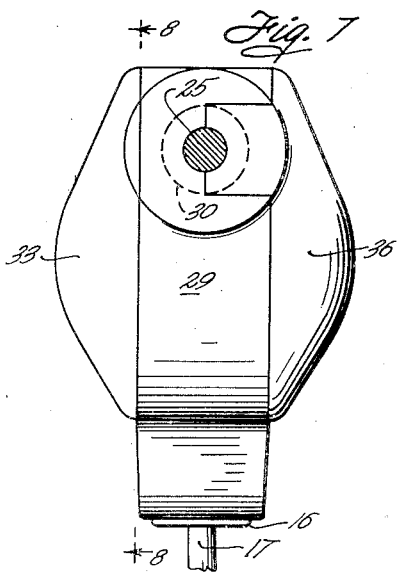
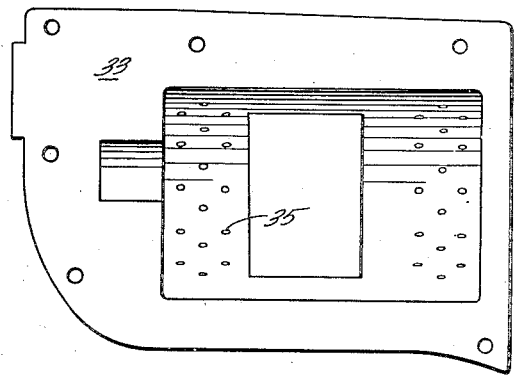
Inventor
OTIS A. WINDSOR
By Hazard & Miller
Attorneys Patented Apr. 28, 1942

2,281,218

UNITED STATES PATENT OFFICE 2,281,218

ELECTRIC DRILL

Otis A. Windsor, Santa Monica, Calif., assignor, by mesne assignments, to Armstrong Tool Manufacturing Company, Los Angeles, Calif.

Application July 9, 1940, Serial No. 344,618

14 Claims. (Cl. 77—6)

This invention relates to improvements in electric drills.

An object of the invention is to provide an improved electric drill having a chuck or the equivalent which receives the drill and rotates the same, the chuck being driven by an electric motor in such a manner as to be electrically insulated therefrom. In many instances, in electric hand drills now in general use short circuits develop or loose electrical connections develop so that the drill itself is placed in an electric circuit. Consequently, under these circumstances the drill on being applied to the work burns or melts the material that is to be drilled. This is of considerable importance in instances where the material that is being drilled is to form the wing surfaces or fusilage surfaces of aircraft in that if the material should become burned adjacent a rivet hole the entire sheet of material may have to be rejected.

It is consequently an object of the present invention to provide an electric hand drill where the chuck is insulated effectively from the electric motor and connections leading thereto so that even though short circuits should develop or electrical connections loosened the chuck and consequently the drill will never be placed in an electric circuit which might damage material that is to be drilled.

Another object of the invention is to provide an improved portable electric drill wherein the motor and adjacent structure are completely housed within resilient insulating material. These portable drills are sometimes inadvertently or accidentally dropped resulting in damage to sections of thin materials such as that employed for wing surfaces and fusilage surfaces on aircraft and sometimes on being dropped against hard surfaces damage is done to the drill itself. By having the motor completely housed within resilient insulating material damage or injury to material that is being worked upon and of injury to the drill itself is greatly reduced.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of the improved portable drill embodying the present invention;

Fig. 2 is a top plan view of the same;

Fig. 3 is an inside view in elevation of the cover that forms a part of the housing for the drill;

Fig. 4 is a view in side elevation taken on the line 4—4 of Fig. 6, parts being broken away and shown in section illustrating the interior of the housing, the cover being shown as having been removed;

Fig. 5 is a sectional view taken substantially upon the line 5—5 upon Fig. 4 in the direction indicated;

Fig. 6 is a sectional view taken substantially upon the line 6—6 upon Fig. 4 in the direction indicated;

Fig. 7 is a sectional view taken on the line 7—7 upon Fig. 4 in the direction indicated; and Fig. 8 is a view in elevation illustrating the interior of the rear side of the housing taken on the line 8—8 of Fig. 7.

Referring to the accompanying drawings wherein similar reference characters designate similar parts throughout, the drill comprises a suitable electric motor which may be of any conventional or preferred design. The motor illustrated has a laminated stator 10 equipped with a rotor, the shaft of which is indicated at 11. On the rotor there may be a commutator 12 wiped by brushes 13 which are in electrical circuit with conductors 14 leading from a switch 15. These conductors may be connected through a plug 16 to an electric cable 17. The rotor shaft preferably carries a fan or blower 18 and is rotatably mounted on bearings 19 and 20. At its forward end it carries one or more pulleys 21. The stator of the motor is mounted in a U-shaped frame 22, the back of which supports the bearing 20. The forward ends of the U-shaped frame which is preferably formed of metal and connected together by a section of insulating material 23 which may be Bakelite, hard rubber, pressed fiber, or the like. This section of insulating material serves to mount or support the bearing 19 and also a bearing 24 on the chuck shaft 25. The chuck shaft carries a suitable chuck of any preferred design indicated at 26 which is designed to receive the drill, not shown. On the chuck shaft there are pulleys 27 which correspond in number and which are in alignment with the pulleys 21. Rubber belts 28 are trained over the pulleys 21 and 27, thus providing an insulating drive between the rotor shaft 11 and the chuck shaft 25.

The housing for the drill is preferably made of soft rubber molded into three separate sections. The center section indicated at 29 fits about the frame 22 and extends forwardly therefrom to enclose the belt drive and to provide one-half of the support for the forward bearing 30 of the chuck shaft. The rear portion of the center section is extended and shaped to provide the major portion of the handle 31 which is recessed as at 32 on its forward side to receive or partially receive the conductors 14, the switch 15, and the socket for the plug 16.

The rear side of this center section of the housing is closed by a rear wall or cover 33 which extends from the forward side of the handle opening 34 forwardly so as to completely enclose the rear side of the motor and the belt drive. This side or cover is perforated as at 35 adjacent the motor. The forward side of the housing is closed by a rubber cover 36 which not only serves to cover the motor and the belt drive but in addition, this cover is extended rearwardly and shaped to conform to the handle 31 and serves to enclose the conductors 14, the switch 15, and the socket for the plug 16. This cover is also perforated adjacent the motor as indicated at 37. Bolts or the equivalent fastening devices indicated at 38 extend through the sections of housing and serve to firmly fasten them together. The forward extension of the cover 36 serves to seat the forward half of bearings 30.

It will be noted that a portable drill thus constructed has the chuck shaft and the chuck electrically insulated from the electric motor and all electrical connections leading thereto so that in the event of any short circuits or loose connections the chuck shaft will never be placed in electric circuit to burn or melt grounded metal that the drill may touch. Furthermore, as the entire housing is formed of relatively soft rubber it not only serves to electrically insulate conductors that come in contact with it but in the event that the drill should be dropped the resilient housing prevents damage to the drill itself and to material that it may strike. The rubber housing being somewhat of a heat insulator as well as an electric insulator, it is advantageous to employ the fan or blower 18 and to have the housing perforated as at 35 and 37 so that air may be freely circulated about the motor to keep it cool.

In the event that the motor or the drive or electrical connections leading to the motor should require repair or replacement at any time this may be easily accomplished by merely removing cover 36. When this cover is removed the frame 22 may be laterally slid out of the housing carrying with it all of the working parts of the drill rendering them immediately accessible for repair or replacement.

It will be appreciated from the above-described construction that the improved drill is relatively simple and durable and that the parts thereof may be easily, quickly, and cheaply manufactured and assembled together.

Various changes may be made in the details of construction without departing from the spirit or scope of the invention as defined by the appended claims.

I claim:

1. An electric drill having a chuck, a motor for driving the same, the driving connection between the motor and the chuck being such as to electrically insulate the chuck from the motor so that in the event that short circuits or loose connections should develop in the motor or connections leading thereto current will not be carried to the chuck, the motor being enclosed in resilient insulating material.

2. An electric drill having an electric motor, a frame for the motor, a housing formed of insulating material removably receiving the motor and frame, a cover for retaining the motor and frame in the housing, said housing and cover being formed of insulating material, a chuck rotatably mounted in the housing, and means providing an insulating driving connection between the motor and the chuck, the housing being extended to provide the handle for the drill and being recessed to receive the switch and electrical connections leading to the motor, the cover being similarly extended and covering the switch and connections leading to the motor.

3. An electric drill having an electric motor, a frame for the motor, a rotatable chuck, means providing an insulating driving connection between the motor and the chuck, and means providing a resilient insulating housing about the motor and driving connection, and a handle on the housing.

4. An electric drill having an electric motor, a frame for the motor, a rotatable chuck, means providing an insulating driving connection between the motor and the chuck, means providing a resilient insulating housing about the motor and driving connection, and a handle on the housing formed integral therewith.

5. An electric drill having an electric motor, a frame for the motor, a rotatable chuck, means providing an insulating driving connection between the motor and the chuck, means providing a resilient insulating housing about the motor and driving connection, and a handle on the housing, said handle and housing being longitudinally divided into sections detachably secured together.

6. An electric drill having an electric motor, a frame for the motor, a rotatable chuck, means providing an insulating driving connection between the motor and the chuck, means providing a resilient insulating housing about the motor and driving connection, and a handle on the housing, said handle and housing being longitudinally divided into sections detachably secured together, the opposed faces of the handle sections being recessed to accommodate electrical connections leading to the motor.

7. An electric drill having an electric motor, a frame for the motor, one end of the frame being provided by insulating material, bearings in said insulating material for the rotor shaft of the motor and a chuck, said bearing being insulated from one another by said insulating material, a chuck rotatable in its bearings, means providing an insulating driving connection between the rotor shaft and the chuck, and a resilient insulating housing enclosing the motor and its frame.

8. An electric drill having an electric motor, a frame for the motor, one end of the frame being provided by insulating material, bearings in said insulating material for the rotor shaft of the motor and a chuck, said bearings being insulated from one another by said insulating material, a chuck rotatable in its bearings, means providing an insulating driving connection between the rotor shaft and the chuck, and a resilient insulating housing enclosing the motor and its frame, said housing being longitudinally divided into separable sections.

9. An electric drill having an electric motor, a frame for the motor, one end of the frame being provided by insulating material, bearings in said insulating material for the rotor shaft of the motor and a chuck, said bearings being insulated from one another by said insulating material, a chuck rotatable in its bearings, means providing an insulating driving connection between the rotor shaft and the chuck, and a resilient insulating housing enclosing the motor and its frame, said housing being longitudinally divided into separable sections, said sections being equipped with handle-forming extensions.

10. An electric drill having an electric motor, a frame for the motor, one end of the frame being provided by insulating material, bearings in said insulating material for the rotor shaft of the motor and a chuck, said bearings being insulated from one another by said insulating material, a chuck rotatable in its bearings, means providing an insulating driving connection between the rotor shaft and the chuck, and a resilient insulating housing enclosing the motor and its frame, said housing being longitudinally divided into separable sections, said sections being equipped with handle-forming extensions, the opposed faces of which are recessed to accommodate electrical connections leading to the motor.

11. An electric drill having an electric motor and a rotatable chuck, a driving connection between the motor and the chuck, and means providing a resilient insulating housing about the motor and the driving connection, and a handle on the housing, there being lead-in conductors to the motor extending through a portion of the resilient housing.

12. An electric drill having an electric motor, a rotatable chuck, means providing a driving connection between the motor and the chuck, and a resilient insulating housing enclosing the motor, a handle on the housing, said handle having lead-in conductors to the motor extending therethrough.

13. An electric drill having an electric motor, a rotatable chuck, means providing a driving connection between the motor and the chuck, and a resilient insulating housing enclosing the motor, a handle on the housing, said handle having lead-in conductors to the motor extending therethrough, said handle being longitudinally divided into sections detachably secured together the opposed faces of the handle sections being recessed to accommodate electrical connections leading to the motor.

14. An electric drill having an electric motor, a rotatable chuck, means providing a driving connection between the motor and the chuck, and a resilient insulating housing enclosing the motor, a handle on the housing, said handle having lead-in conductors to the motor extending therethrough, said handle and housing being longitudinally divided into sections detachably secured together, the opposed faces of the handle sections being recessed to accommodate electrical connections leading to the motor.

OTIS A. WINDSOR.